United States Patent
Debe et al.

(10) Patent No.: US 7,901,829 B2
(45) Date of Patent: Mar. 8, 2011

(54) ENHANCED CATALYST INTERFACE FOR MEMBRANE ELECTRODE ASSEMBLY

(75) Inventors: Mark K. Debe, Stillwater, MN (US); Amy E. Hester, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1409 days.

(21) Appl. No.: 11/224,846

(22) Filed: Sep. 13, 2005

(65) Prior Publication Data

US 2007/0059573 A1    Mar. 15, 2007

(51) Int. Cl.
*H01M 8/10* (2006.01)
*H01M 4/86* (2006.01)
*H01M 4/88* (2006.01)
*H01M 4/04* (2006.01)

(52) U.S. Cl. ............... 429/483; 429/523; 429/535

(58) Field of Classification Search ........... 429/30; 521/127
See application file for complete search history.

(56) References Cited

U.S. PATENT DOCUMENTS

| | | | |
|---|---|---|---|
| 5,183,597 A | | 2/1993 | Lu |
| 5,879,828 A | * | 3/1999 | Debe et al. ............ 429/41 |
| 6,136,412 A | * | 10/2000 | Spiewak et al. ........... 428/143 |
| 6,319,293 B1 | * | 11/2001 | Debe et al. ............ 29/623.3 |
| 6,429,533 B1 | | 8/2002 | Li et al. |
| 6,465,041 B1 | | 10/2002 | Frisk et al. |
| 6,673,127 B1 | | 1/2004 | Allen et al. |
| 6,692,856 B2 | | 2/2004 | Smotkin |
| 6,749,892 B2 | | 6/2004 | Chang |
| 2003/0170519 A1 | | 9/2003 | Mittelstadt et al. |
| 2004/0170884 A1 | | 9/2004 | Frank et al. |
| 2005/0069755 A1 | | 3/2005 | Vernstrom et al. |

FOREIGN PATENT DOCUMENTS

WO    WO 94/15210    7/1994
WO    WO 02/061871 A2    8/2002

* cited by examiner

*Primary Examiner* — Dah-Wei Yuan
*Assistant Examiner* — Angela J. Martin
(74) *Attorney, Agent, or Firm* — Julie A. Lapos-Kuchar; Philip Y. Dahl

(57) ABSTRACT

A membrane electrode subassembly includes an ion conducting membrane and a microporous layer having microtextured surfaces. Complementary features of the microtextured surfaces may be formed as grooves, ridges, pyramids or other shapes. Features of the microtextured surface of the ion conducting membrane engage features of the microporous layer. The engagement of the features of the microtextured surfaces may involve an interlocking fit, a tongue and groove fit, or another type of engagement. A thin catalyst layer is disposed between the microtextured surfaces. The microtextured surfaces increase the surface area at the catalyst layer interfaces.

39 Claims, 12 Drawing Sheets

ENHANCED CATALYST INTERFACE FOR MEMBRANE ELECTRODE ASSEMBLY

FIELD OF THE INVENTION

The present invention relates generally to an enhanced catalyst interface for a membrane electrode assembly.

BACKGROUND OF THE INVENTION

Electrochemical devices, such as proton exchange membrane fuel cells, sensors, electrolyzers, chlor-alkali separation membranes, and the like, have been constructed from membrane electrode assemblies (MEAs). An MEA used in a typical electrochemical cell, for example, includes an ion conductive membrane (ICM) that is in contact with catalyst-containing anode and cathode electrode layers. The ICM typically comprises a polymeric electrolyte material, which may constitute its own structural support or may be contained in a porous structural membrane.

The anode/membrane/cathode structure is sandwiched between two microporous, electrically conductive elements called diffusion current collectors (DCCs) to form a five layer MEA. Ions formed at the anode are transported to the cathode, allowing current to flow in an external circuit connecting the electrodes.

Catalyst layers have been formed using nanostructured support elements bearing particles or thin films of catalytic material. The nanostructured catalyst electrodes may be incorporated into very thin layers forming a dense distribution of catalyst particles on the ICM surface.

Effective MEA design strives toward increased interfacial area contact between the various layers of the MEA sandwich in order to effectively facilitate the transport of reactants and byproducts through the MEA. Increased interfacial area provides a higher efficiency and increased current carrying capacity.

The present invention describes an enhanced interface for MEA subassemblies and provides methods of making the enhanced interface.

SUMMARY OF THE INVENTION

The present invention is directed to methods and articles involving an enhanced catalyst interface. One embodiment is directed to a membrane electrode subassembly having the enhanced catalyst interface. The subassembly includes an ion conducting membrane having a microtextured first surface. The subassembly also includes a microporous layer having a microtextured second surface. The microtextured first surface and the microtextured second surface have complementary features. The features of the microtextured second surface are configured to engage the features of the microtextured first surface. A catalyst layer is disposed between the first and second microtextured surfaces. The microporous layer is disposed on an electrode backing.

In various implementations, the complementary features may facilitate a frictional or mechanical linkage between the microtextured first and second surfaces. For example, the complementary features may facilitate mechanical capture between the microtextured first and second surfaces. In some configurations, the engagement of the complementary features may facilitate an interference fit, an interlocking fit, a fractal interlocking fit, a press fit, and/or a tongue and groove fit between the microtextured first and second surfaces.

For example, the complementary features may have a generally pyramidal shape, a generally sawtooth shape, or other shapes. The complementary features may be formed as ridges, grooves, pyramids, or other geometries. According to some aspects of the embodiment, registration features may be disposed on the microtextured first and second surfaces to facilitate alignment of the complementary features. The features of the microtextured first surface may have a shape differing from the shape of the features of the microtextured second surface.

The catalyst layer of the subassembly may be formed of one or more thin films of catalyst material. In some implementations, the catalyst layer may comprise a nanostructured catalyst layer including nanostructured support whiskers formed of perylene red or other material. The nanostructured support whiskers may bear nanoscopic catalyst particles or a thin catalyst film.

According to an aspect of the invention, the ion conducting membrane of the subassembly may include a microtextured third surface. The subassembly may further include a second microporous layer having a microtextured fourth surface. The microtextured third surface and the microtextured fourth surface may also have complementary features, wherein the features of the microtextured fourth surface are configured to engage the features of the microtextured third surface. A second catalyst layer is disposed between the microtextured third surface and the microtextured fourth surface. First and second electrode backing layers may be disposed on the microporous layers. One or more of the subassembly components may be formed as a roll good.

The subassembly may include first and second flow field plates having an arrangement of gas flow channels and lands. The flow field plates are configured to contact the electrode backing layers under compressive force. The engagement of the complementary features facilitates an interface between the microtextured surfaces that substantially prevents tenting of the microtextured surfaces under the compressive force.

Another embodiment of the invention is directed to a method of manufacturing a subassembly having an enhanced catalyst interface. The method involves developing a microtextured first surface on an ion conducting membrane and developing a microtextured second surface on a diffusion current collector layer. The microtextured first surface and the microtextured second surface have complementary features, wherein the features of the microtextured first surface are configured to engage the features of the microtextured second surface. The method further involves disposing a catalyst layer between the microtextured first surface and the microtextured second surface.

According to various aspects of the embodiment, the microtextured surfaces may be imparted to the ion conducting membrane while transferring the catalyst layer to the ion conducting membrane. The microtextured second surface may be imparted to the diffusion current collector while transferring the catalyst layer to the diffusion current collector. One or both of the microtextured first and second surfaces may be developed using an embossing process involving an embossing tool such as an embossing drum or wheel. Registration features may be developed on the microtextured first and second surfaces.

According to another aspect, a microtextured pattern may be formed on a transfer substrate. The transfer substrate is then used to emboss the microtextured first surface on the membrane and the microtextured second surface on the DCC layer. A release layer may be provided on the transfer substrate to facilitate development one or both of the microtextured surfaces. The transfer substrate may include catalyst provided on the release layer. The release layer may be a nanostructured layer having nanostructured support whiskers of perylene red. The method of manufacturing the subassembly may be implemented at least in part using a web processing technique.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1A:
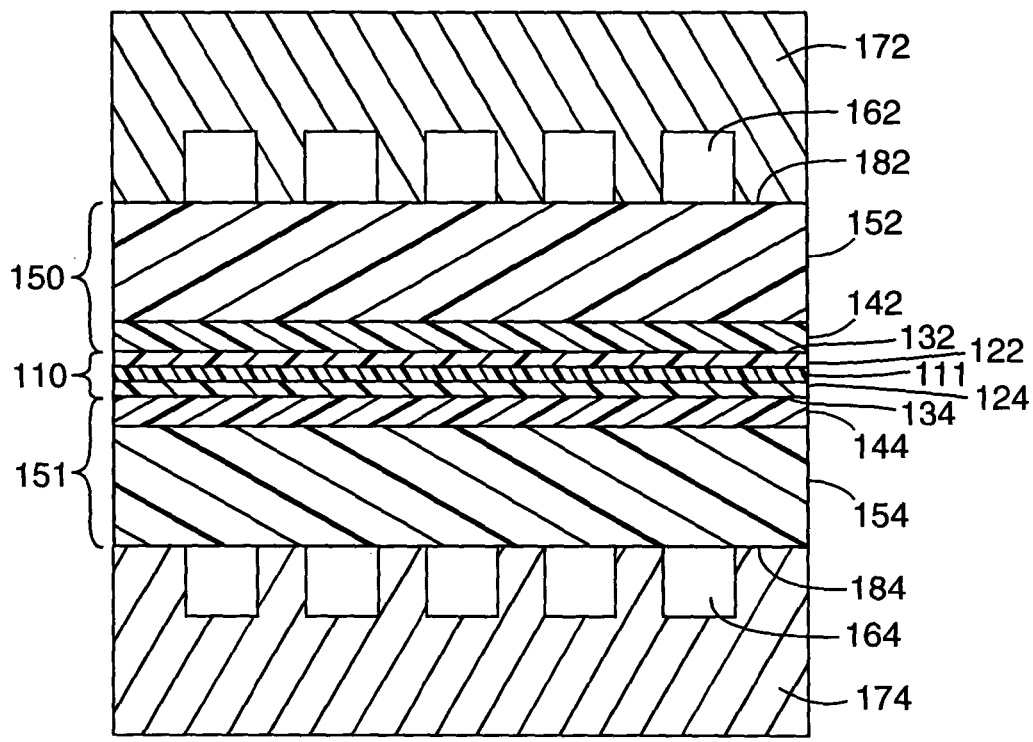
FIGS. 1A and 1B illustrate the basic structure of an MEA subassembly that may include an enhanced interface in accordance with embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

One important property of an MEA catalyst layer is the surface area available for electro-catalysis. It is advantageous to be able to control and increase the area of the catalyst surface to promote the effectiveness of the processes occurring at the catalyst interface. The present invention is directed to an enhanced interface of the catalyst layer linking the ion conducting membrane (ICM) and the microporous layer (MPL) of the diffusion current collector (DCC) and methods of making such an interface. The enhanced interface utilizes complementary microtextured features formed on the ICM and the MPL. The complementary features fit together to increase the surface area of the catalyst interface between the ICM and MPL. The enhanced catalyst interface of the present invention may be advantageously incorporated into MEAs used for fuel cells and/or other electrochemical devices.

The enhanced interface of the present invention increases the utilization of the catalyst at the interface. Further, the increased surface area at the MPL/catalyst/ICM interface reduces electrical resistance at this juncture and increases the area for gas transport through the MPL to the catalyst. Additionally, the interleaving of the complementary features serves to reduce voids and gaps at the interface that may serve as water traps that may inhibit gas transport and cause problems with cold starts and freezing. The complementary features at the interface promote retentive engagement between the MEA components.

FIG. 1A illustrates the basic structure of an MEA subassembly that may include the enhanced interface in accordance with embodiments of the present invention. FIG. 1A illustrates a catalyst coated membrane (CCM) based MEA structure. The MEA structure comprises a CCM 110 sandwiched between diffusion current collector (DCC) structures 150, 151. The CCM 110 comprises an ICM 111 having catalyst layers 122, 124 disposed on the top and bottom surfaces of the ICM 111. The catalyst layers 122, 124 may comprise thin films of catalyst directly vapor coated onto the membrane. In some embodiments, the catalyst layers 122, 124 may comprise nanostructured thin film (NSTF) catalyst layers. An NSTF catalyst layer may comprise nanostructured support whiskers bearing nanoscopic catalyst particles or bearing thin films of catalyst.

The DCC structures 150, 151 include microporous layers (MPLs) 142, 144 and electrode backing (EB) layers 152, 154. The MEA includes enhanced interfaces 132, 134 between the CCM 110 and the MPLs 142, 144 in accordance with embodiments of the invention. Flow field plates 162, 164 are disposed on either side of the DCC structures 150, 151. The flow field plates include lands 182, 184 that contact the DCCs 150, 151 under compressive force when installed in a fuel cell stack. Gas flow channels 172, 174 in the flow field plates 162, 164 allow distribution of reactants or byproducts across the surface of the DCCs 150, 151.

In this embodiment, the enhanced interface of the present invention includes complementary features on the MPLs 142, 144 and the CCM 110. The complementary features of the MPLs 142, 144 and the CCM 110 fit together at the interfaces 132, 134 to advantageously increase the surface area of contact between the MPLs 142, 144 and CCM 110.

Figure 1B:
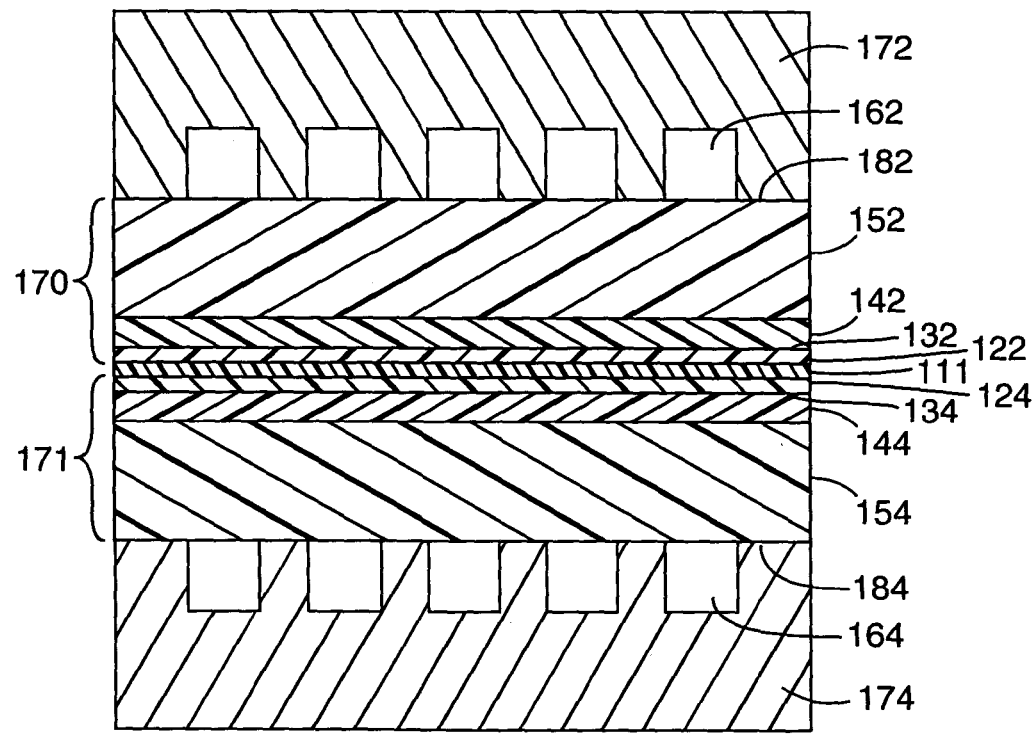

In another embodiment, illustrated in FIG. 1B, the catalyst layer may be disposed on the DCCs 170, 171 rather than the ICM 110. FIG. 1B illustrates a catalyst coated DCC structure. The MEA subassembly illustrated in FIG. 1B comprises an CCM 111 sandwiched between catalyst coated diffusion current collector (DCC) structures 170, 171. The first DCC 170 comprises a nanostructured thin film (NSTF) anode catalyst layer 122 disposed on the surface of a microporous layer (MPL) 142. The DCC 170 further comprises an electrode backing (EB) layer 152. The second DCC 171 comprises a nanostructured thin film (NSTF) cathode catalyst layer 124 disposed on the surface of a microporous layer (MPL) 144. The DCC 171 further comprises an electrode backing (EB) layer 154. The MEA subassembly includes enhanced interfaces 132, 134 between the ICM 111 and the catalyst coated DCCs 170, 171 in accordance with embodiments of the invention.

In this embodiment, the enhanced interface of the present invention involves the formation of complementary features on the catalyst coated DCCs 170,171 and the 1 CM 111. The complementary features of the DCCs 170,171 and the ICM 111 engage at the interfaces 132, 134 to advantageously increase the surface area of contact between the catalyst coated DCCs 170, 171 and ICM 111.

In further embodiments, one or both of the catalyst layers 122, 124 may be disposed partially on the ICM 111 and partially on the DCCs 170, 171. The examples provided below are described in terms of a catalyst coated membrane, although the DCC may alternately comprise the entire catalyst layer or the catalyst layer may be partially disposed on the DCC and partially disposed on the ICM.

The formation of MEAs incorporating nanostructured thin film (NSTF) catalyst layers is described in U.S. Pat. No. 6,136,412 which is incorporated herein by reference. NSTF catalyst layers may include one or more layers of acicular nanostructured support elements bearing a catalyst material. In one implementation, the catalyst coated nanostructured elements are transferred to an ICM under pressure and heat to form a CCM having thin, partially embedded anode and cathode layers on opposing surfaces of the membrane. In other implementations, using a similar method, the NSTF catalyst layers may be transferred to the MPL of a DCC. Alternatively, the NSTF catalyst layers may be formed directly on the MPL of the DCC.

As described in the previously incorporated U.S. Pat. No. 6,136,412, approaches to forming CCMs may involve imparting microtextured features to the catalyzed membrane surfaces. For example, the microtextures may have features sized in the 1 to 50 μm range. The microtextures can be imparted to the CCM by any effective method, such as by lamination or static pressing. In one implementation, the microtextures are imparted to the CCM during the step of transferring the nanostructured elements to the ICM. The nanostructured catalyst elements may be formed on a microtextured catalyst transfer substrate (MCTS) which is placed against the ICM. Pressure, and optionally heat, are applied to MCTS/ICM subassembly to bond the nanostructured catalyst elements to the membrane and also to impart the microtextured surface of the MCTS to the CCM. The MCTS is stripped away leaving the microtextured CCM.

Figure 2:
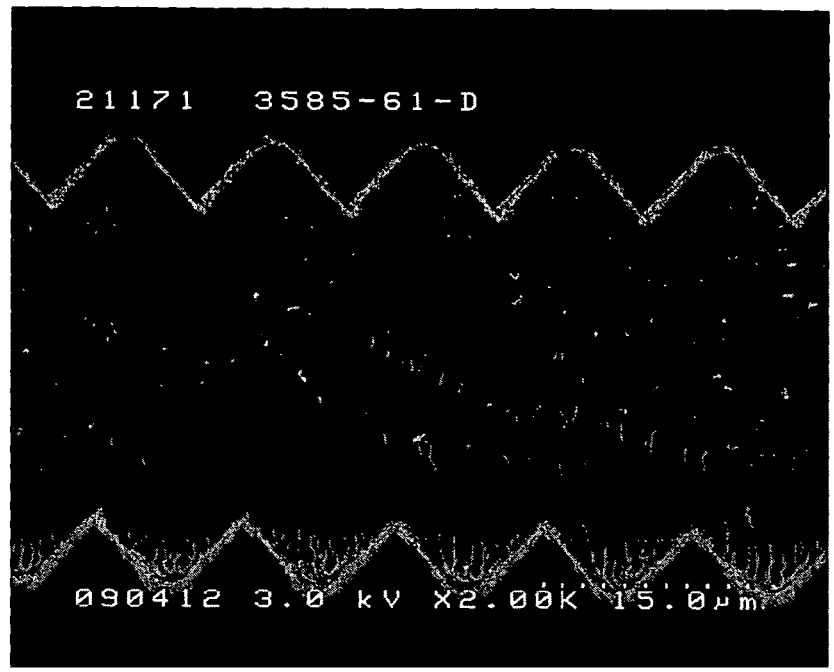
FIG. 2 is a cross sectional view of a catalyst coated membrane having microtextured surfaces formed by catalyst transfer from a microtextured catalyst transfer substrate (MCTS)

FIG. 2 is a cross sectional view of a catalyst coated membrane having microtextured surfaces formed by catalyst transfer from a microtextured catalyst transfer substrate (MCTS). In this example, the membrane is about 30 μm thick, and the peak to valley heights are about 6 μm. The acicular NSTF catalyst elements can just be barely resolved at the surfaces, being only approximately 1 μm thick.

Figure 3:
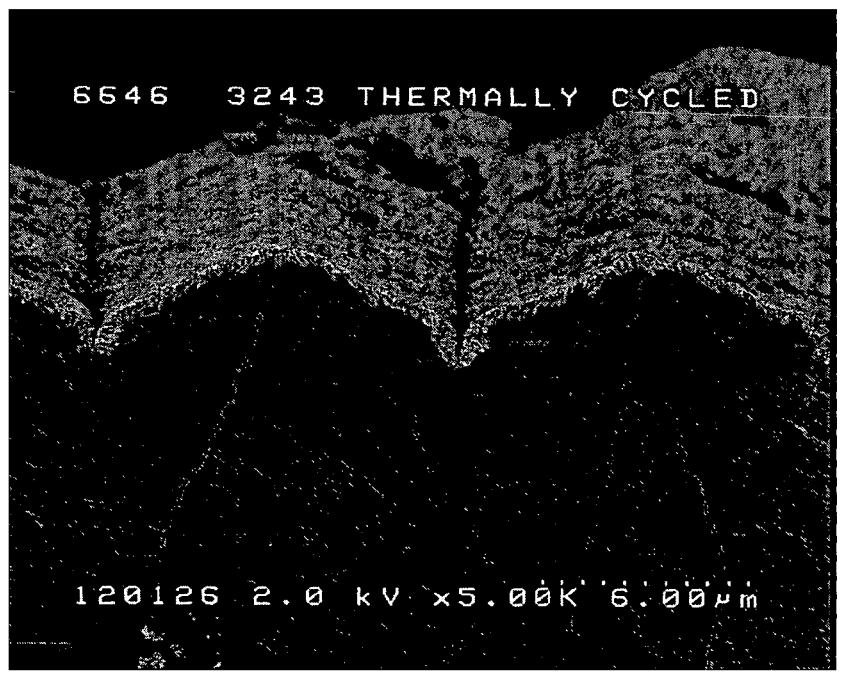
FIG. 3 shows a cross-section of a CCM, with the planar DCCs removed, after testing as a fuel cell showing flattening of the microtextures.

One of the advantages of microtexturing the membrane surface is to increase the surface area over that of a planar surface. For the example in FIG. 2, in which the included angle of the valley side walls is 90°, the surface area is increased by $(2)^{1/2}=1.414$. For electrochemical reactions, increasing the catalyst surface area is highly desirable. However, when the CCM is used to form a complete MEA by sandwiching it between two normally planar diffusion current collector (DCC) layers and applying compression, the microtextured surface of the CCM may be flattened as indicated in FIG. 3. FIG. 3 shows a cross-section of a CCM, with the planar DCCs removed, after testing as a fuel cell. The microtextured pattern in the surface of the CCM is seen to be permanently partially flattened. The flattening of the microtextured pattern is expected to be increased when the CCM is installed in the fuel cell under compression.

Figure 4:
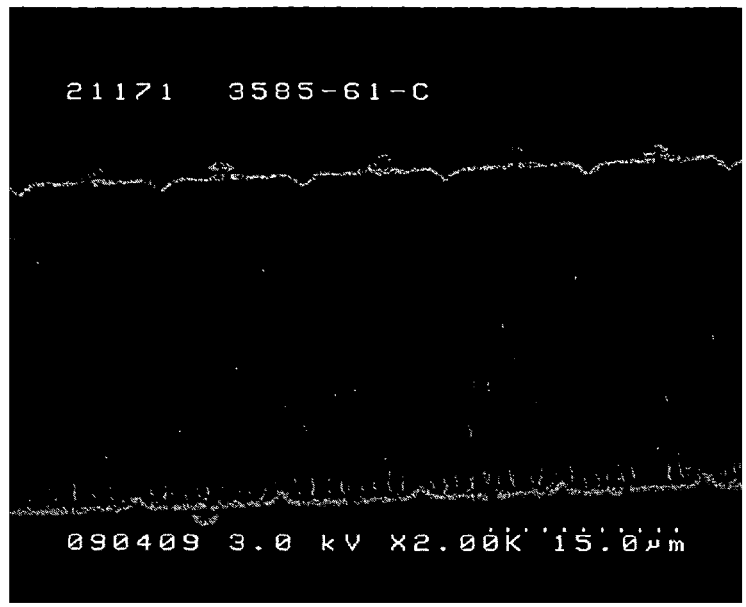
FIG. 4 shows a scanning electron micrograph (SEM) cross-section of a microtextured CCM after hot-roll calendaring, illustrating more flattened microtextured features, which represents the likely surface structure of the CCM during actual use in a fuel cell.

The flattening of the CCM surface reduces the effectiveness of the original increase in surface area because access by hydrogen or oxygen atoms to the compressed catalyst electrode layer is restricted. Additionally, voids may be formed between the compressed CCM peaks and the DCC surfaces over channels of the flow field bi-polar plates during compression, a phenomenon denoted "tenting." The voids can fill and hold water leading to flooded cathodes and further mass transport limited performance of the fuel cell. In these void areas, there is also no contact between the catalyst layer surface and the DCC, which can lead to higher cell resistance and lower performance. FIG. 4 shows a scanning electron micrograph (SEM) cross-section of a microtextured CCM after hot-roll calendaring, illustrating more flattened microtextured features, which represents a possible surface structure of the CCM during actual use in a fuel cell under the land areas of the flow field.

Embodiments of the invention involve forming microtextured features on the MPL side of at least one DCC of the MEA. The microtextured features are complementary to features formed on the CCM. The complementary features of the CCM and the MPL engage to increase the surface area of the interface between the CCM and MPL. The features can be fit together, for example, as in a "tongue and groove" arrangement, so that the surface area between the catalyst electrodes and the MPL is increased, thus improving MEA operation.

Figure 5A:
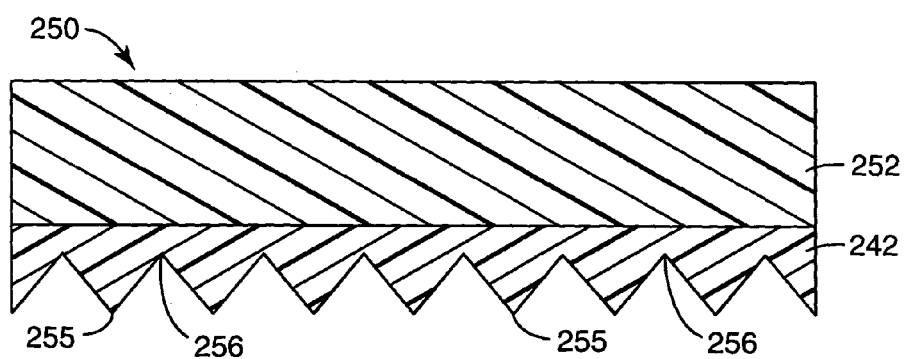
FIGS. 5A-5D illustrate complementary features of MEA subassemblies in accordance with embodiments of the invention.
Figure 5B:
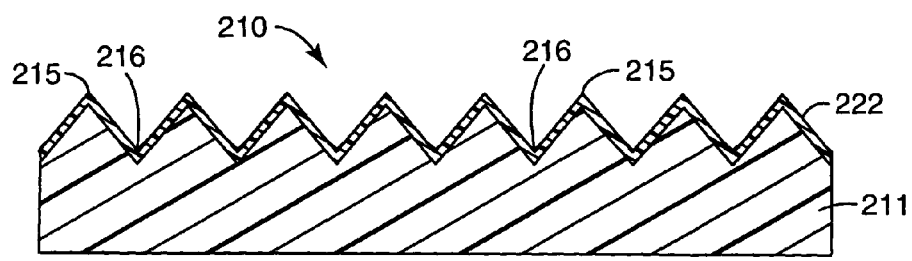
Figure 5C:
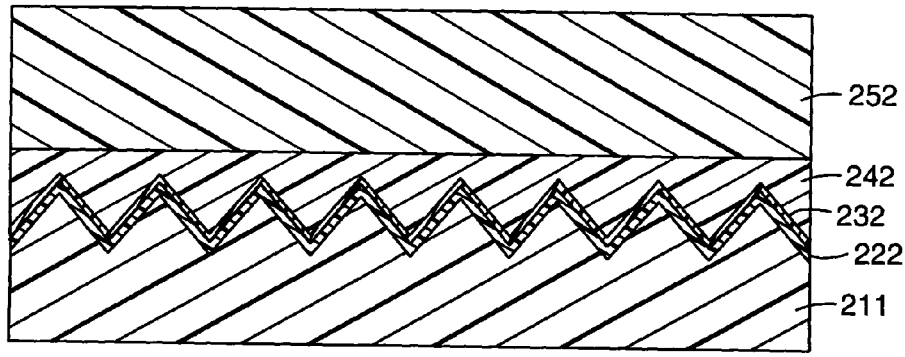

FIGS. 5A-5C illustrate complementary features of the CCM and MPL in accordance with an embodiment of the invention. FIG. 5A illustrates a partial cross section of a DCC 250 comprising an EB layer 252 and a microtextured MPL 242 having features 255, 256. FIG. 5B shows a CCM 210 partial cross section illustrating a microtextured ICM 211 and having an NSTF catalyst layer 222. In one implementation, the NSTF catalyst layer 222 may comprise nanostructured support elements of C.I. PIGMENT RED 149, denoted herein as "perylene red," bearing a catalyst material such as a platinum group metal. The features 255, 256 of the DCC 250 are complementary to the CCM features 215, 216 so that when the surfaces are brought together, as illustrated in FIG. 5C, the complementary features 255, 215, 256, 216 engage to provide increased surface area at the interface 232 of the MPL 242 and the CCM 210.

Figure 5D:
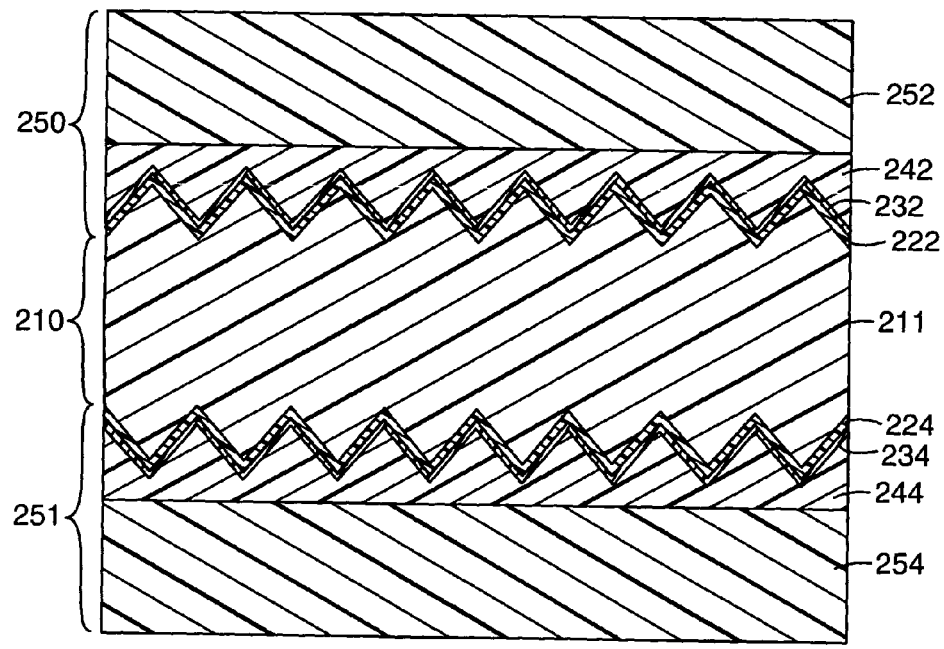

FIG. 5D illustrates an MEA having microtextured CCM 211 with microtextured DCCs 150, 151 disposed on either side of the CCM 211. The CCM includes first and second microtextured surfaces having first and second catalyst layers 222, 224. Each DCC 150, 151 includes a MPL 142, 144 that has features that are complementary to those of the CCM 211. FIG. 5D illustrates an MEA having features of the same type on each surface of the CCM 211, however, the features could be different on different sides of the CCM 211, e.g., pyramidal on the top surface and hemispherical on the bottom surface.

The features of the CCM and MPL surfaces may be formed as any shape that facilitates increased surface area at the CCM/MPL interface. Some exemplary shapes for the CCM 610 and DCC 650 surfaces are illustrated in FIGS. 6A-6F. For example, the features may in cross section have rounded shapes (e.g., FIG. 6A), a triangular shapes (e.g., FIG. 6D) a sawtooth shape (e.g., FIG. 6B), and/or other shapes. The features may be formed to enhance the frictional linkage and/or mechanical linkage between the CCM and the DCC. For example, the complementary features of the CCM and MPL may be formed to facilitate mechanical capture between the CCM and MPL. In various embodiments, the features may be formed to produce a retentive fit between the features, such as a press fit, an interference fit, an interlocking fit (e.g., FIG. 6E), and/or a fractal interlocking fit (e.g., FIG. 6F) when engaged.

The features of the CCM and the DCC may be formed to prevent tenting or other distortion of the surfaces of the microtextured MPL and/or the microtextured CCM under compressive force, such as when the MEA is installed under compression between flow field plates of a fuel cell stack.

Figure 6A:
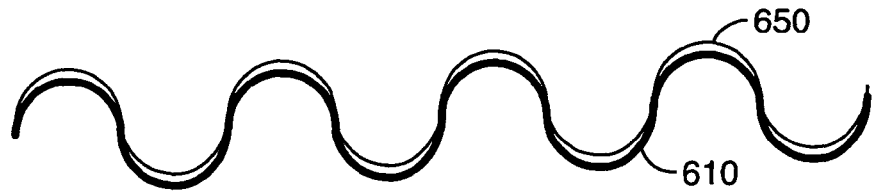
FIGS. 6A-6F illustrate exemplary shapes for the MEA subassembly complementary features in accordance with embodiments of the invention.
Figure 6B:
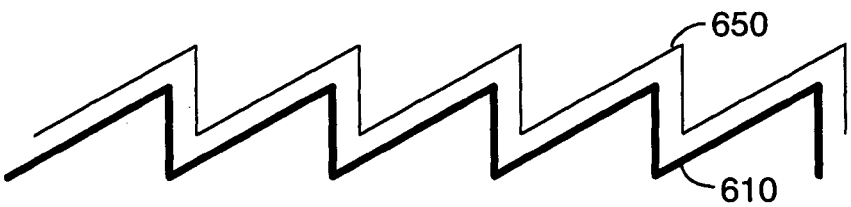
Figure 6C:
Figure 6D:
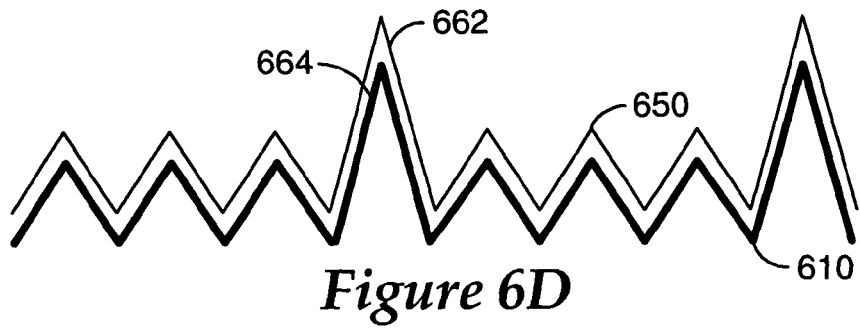
Figure 6E:
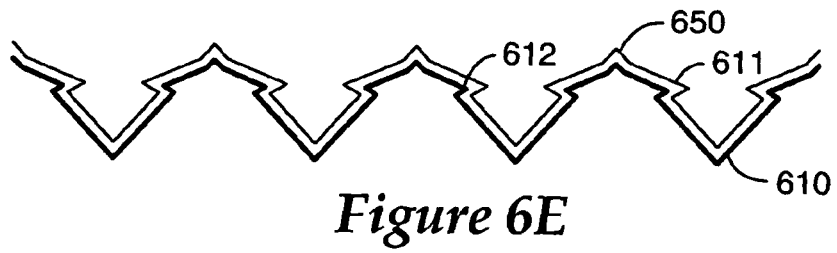
Figure 6F:
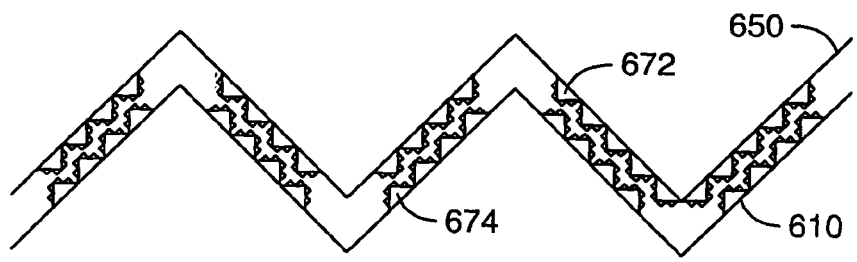

FIG. 6E illustrates interlocking features 611, 612. FIG. 6F illustrates fractal-like features which may be engaged to provide an interlocking fit. FIG. 6F illustrates fractal-like features 672, 674 that may provide a fractal interlocking fit between the CCM 610 and the DCC 650. The fractal-like features 6672, 674 provide progressively smaller engagement features. The features of the CCM 610 surface may be the same as, or different from the features of the DCC 650. As illustrated in FIG. 6D, the features may include registration features 662, 664 that facilitate alignment between the features of the CCM 610 and the features of the DCC 650. When viewed in three dimensions, the features may appear as grooves, ridges, pyramids, hemispheres, cones, rods, and/or other geometric shapes.

Figure 7:
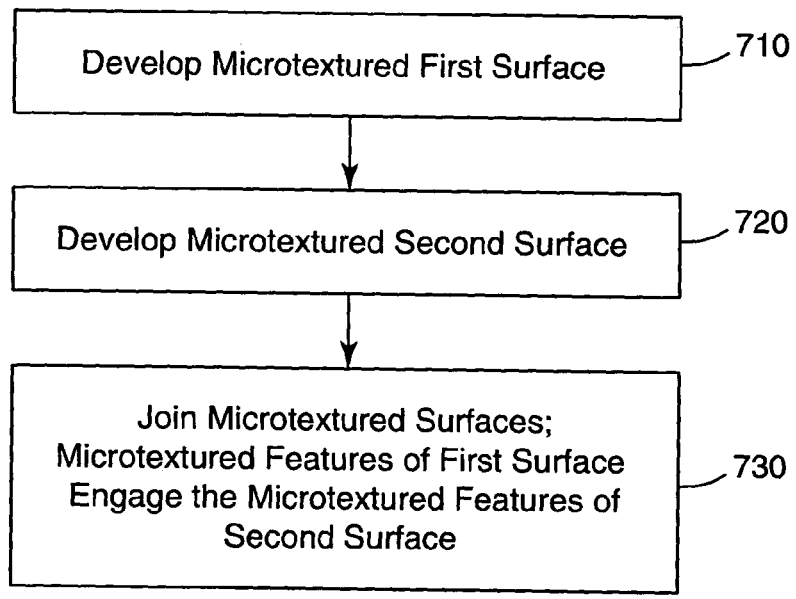
FIG. 7 is a flowchart of a process for making an MEA subassembly that uses the complementary surface features in accordance with embodiments of the invention.

In some embodiments, both the CCM and the MPL surface may have an NSTF layer. One or both of the NSTF layers may include a catalyst coating. The nanostructured whiskers of an NSTF layer may bear whiskerettes creating a fractal or fractal-like surface structure. When both CCM and MPL surfaces include NSTF layers, the nanostructured whiskers and/or whiskerettes may engage to produce a fractal interlocking fit between the CCM and the DCC FIG. 7 is a flowchart of a process for making an MEA subassembly that uses the complementary surface features described herein. A microtextured first surface is developed 710 on a catalyst coated membrane. A microtextured second surface is developed 720 on a microporous layer of a diffusion current collector. The first microtextured surface comprises features that are complementary to the features of the second microtextured surface. When the first and the second microtextured surfaces are joined, the complementary features of the first and the second surfaces engage to form an enhanced interface having increased surface area.

The microtextured features may be developed using any convenient process. For example, the microtextured features may be formed by lamination, embossing, or static pressing, or by other methods. In some implementations, an embossing wheel or drum may be used to transfer the microtextured pattern to the DCC. The complementary microtextured pattern on the CCM may be formed by embossing using a MCTS, of by other methods. In some implementations, the microtextured surfaces of both the DCC and the CCM are developed using an MCTS.

Figure 8:
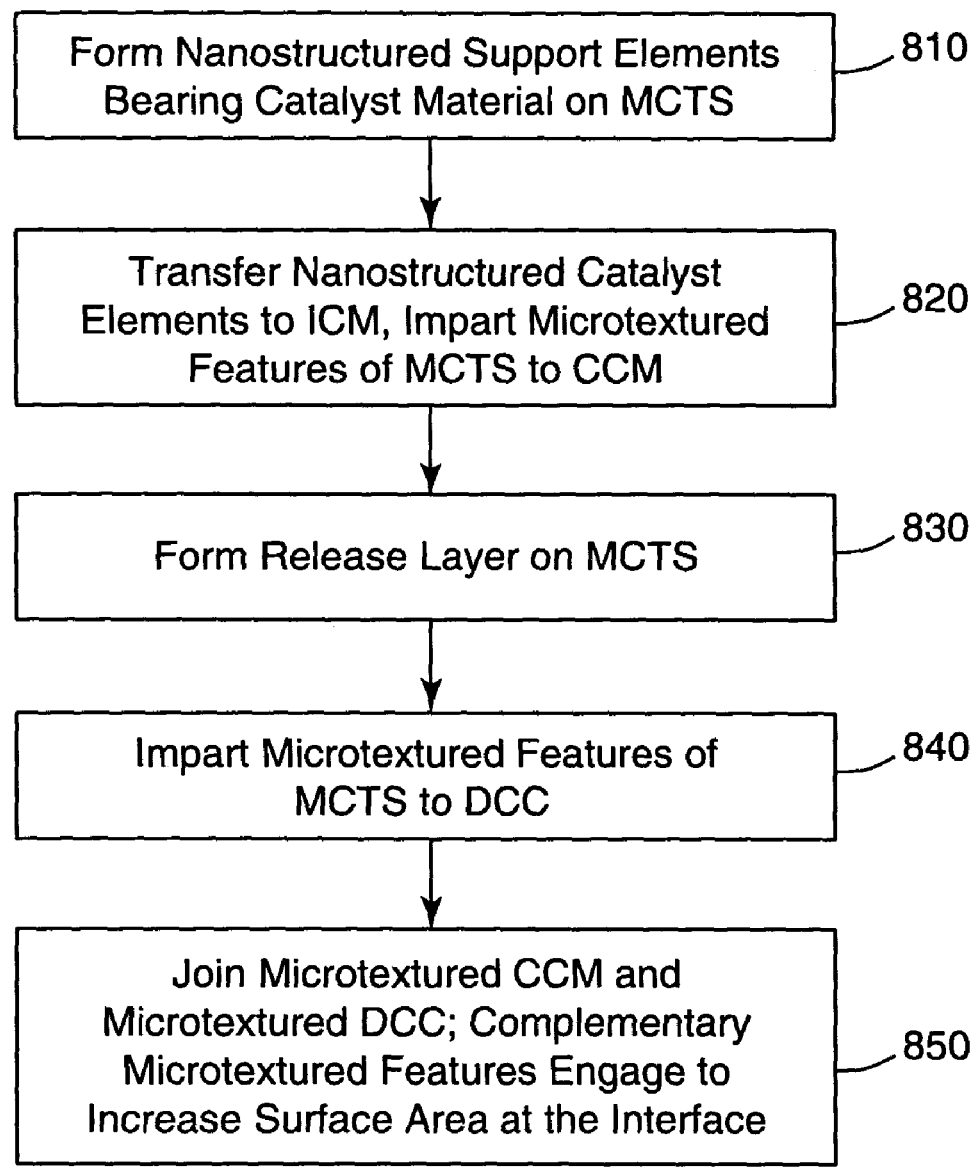
FIG. 8 illustrates a process that may be used to form the subassembly when microtextured surfaces of a CCM and DCC are both formed using the MCTS according to an embodiment of the invention.

FIG. 8 illustrates a process that may be used to form the subassembly when microtextured surfaces of a CCM and DCC are both formed using the MCTS according to one embodiment of the invention. In this embodiment, nanostructured support elements supporting a catalyst material are formed 810 on the MCTS. For example, the nanostructured support elements may comprise an organic pigment material, such as perylene red. The nanostructured support elements may be formed by depositing a layer of perylene red on the MCTS and annealing for a period of time, such as annealing at temperature of about 230° C. to about 270° C. for a period of about 3 minutes to about 60 minutes.

After formation of the nanostructured support elements, a catalyst material, such as a platinum group metal or other suitable catalyst is conformally coated over the nanostructured support elements to form a nanostructured catalyst layer.

The nanostructured catalyst bearing elements are transferred to the ICM using pressure and optionally heat to form a CCM. The microtextures of the MCTS are imparted 820 to the ICM during the transfer of the nanostructured catalyst bearing elements.

The ICM may be composed of any suitable ion exchange electrolyte. The electrolytes are preferably solids or gels. Electrolytes useful in the present invention can include ionic conductive materials, such as polymer electrolytes, and ion-exchange resins. The electrolytes are preferably proton conducting ionomers suitable for use in proton exchange membrane fuel cells.

Copolymers of tetrafluoroethylene (TFE) and a co-monomer according to the formula: $FSO_2$—$CF_2$—$CF_2$—O—$CF$($CF_3$)—$CF_2$—O—$CF$=$CF_2$ are known and sold in sulfonic acid form, i.e., with the $FSO_2$— end group hydrolyzed to $HSO_3$—, under the trade name NAFION ® by DuPont Chemical Company, Wilmington, Del. NAFION ® is commonly used in making polymer electrolyte membranes for use in fuel cells.

Copolymers of tetrafluoroethylene (TFE) and a co-monomer according to the formula: $FSO_2$—$CF_2$—$CF_2$—O—$CF$=$CF_2$ are also known and used in sulfonic acid form, i.e., with the $FSO_2$— end group hydrolyzed to $HSO_3$—, in making polymer electrolyte membranes for use in fuel cells. Most preferred are copolymers of tetrafluoroethylene (TFE) and $FSO_2$—$CF_2CF_2CF_2CF_2$—O—$CF$=$CF_2$, with the $FSO_2$— end group hydrolyzed to $HSO_3$—.

A release layer is formed 830 on the MCTS. In one implementation, the release layer comprises nanostructured elements formed as described above. The nanostructured elements may or may not include the catalyst coating. The MCTS bearing the release layer is placed against the MPL surface of the DCC. Pressure, and optionally heat is used to impart 840 the microtextured pattern of the MCTS to the MPL. The microtextured surfaces of the CCM and the DCC are joined 850, engaging the complementary features of the CCM and DCC surfaces.

Alternate methods for making MEA subassembly involve a microtextured ICM without the catalyst layer and microtextured catalyst coated DCC. In some embodiments, one or more components of the subassembly may be formed as roll good, or may be formed using web processing techniques.

Figure 9A:
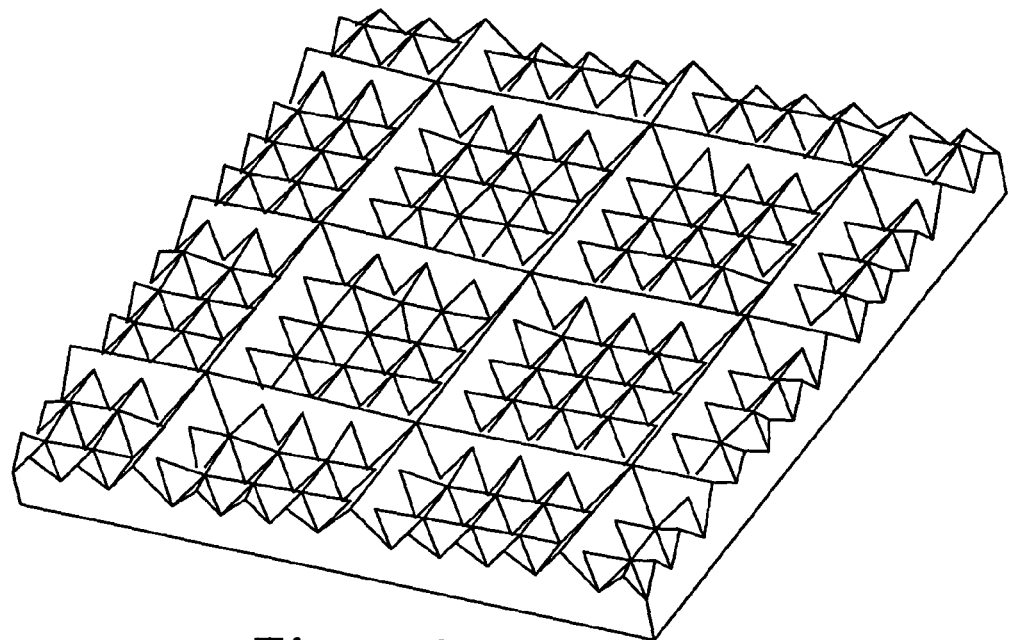
FIG. 9A illustrates a tool model used for forming an MCTS having pyramidal microtextured features in accordance with embodiments of the invention.
Figure 9B:
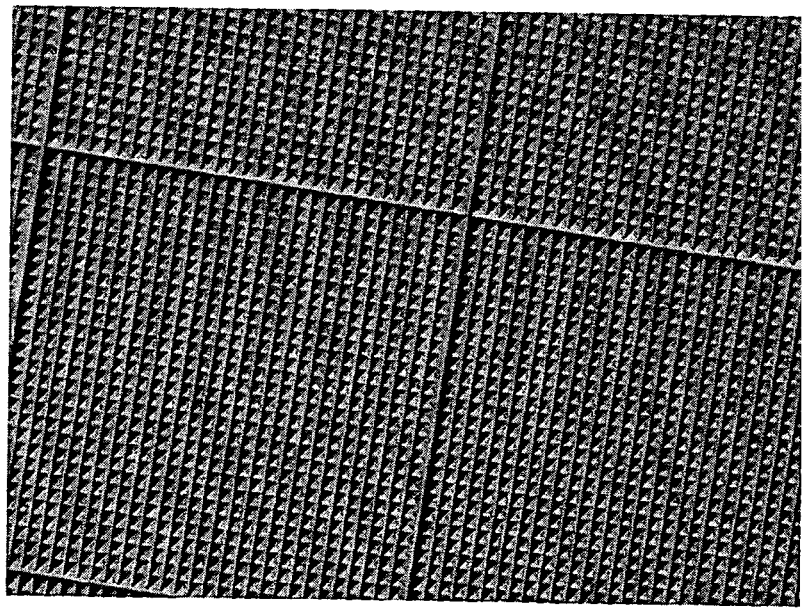
FIG. 9B depicts an MCTS made from the tool of FIG. 9A.
Figure 9C:
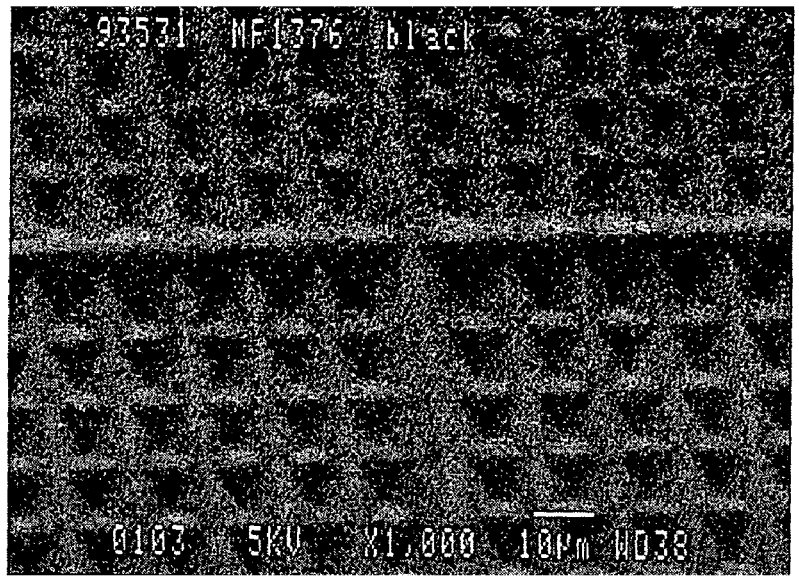
FIGS. 9C and 9D illustrate the MCTS of FIG. 9B after the nanostructured catalyst elements are formed on the MCTS.
Figure 9D:
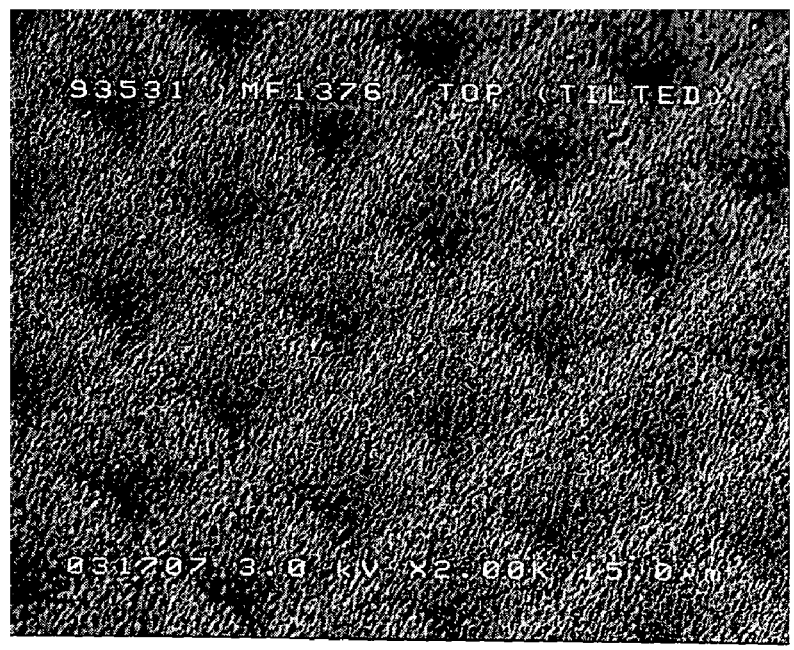

FIG. 9A illustrates a tool model used for forming an MCTS having pyramidal microtextured features. FIG. 9B depicts an MCTS made from such a tool. Note that the MCTS 9B formed with the tool of 9A includes features that could be used as registration features similar to those presented in cross section in FIG. 6D. FIGS. 9C and 9D illustrate the MCTS of FIG. 9B after the nanostructured catalyst elements are formed on the MCTS.

EXAMPLE 1

An approximately 2.5"×2.5" square piece of carbon dispersion coated carbon cloth, (TEXTRON HCB with 1% PTFE/20V/14-2, prepared as described in U.S. Pat. No. 6,465,041) was placed against a 2.5"×2.5" piece of bare (containing no nanostructured catalyst support whiskers on it) MCTS/polyimide so that the MPL of the DCC was in contact with the microtextured grooves side of the MCTS. These two articles were placed between 2 pieces of plain 2 mil thick polyimide. This four article sandwich as placed between 2 pieces of white coated paper that is typically used during CCM lamination. The paper is used to help distribute the compression forces more evenly. This sandwich stack was placed between two 6" square stainless steel plates. The assembly was then placed on the hot platens of a press and heated to 270° F. A total force of 6000 lbs was applied for 2 minutes to the stack.

Figure 10:
FIG. 10 is an optical micrograph of a DCC having the MPL embossed with the groove pattern of an MCTS without using a release layer in accordance with embodiments of the invention.

The result was that a portion of the MPL carbon layer came off the carbon cloth backing and stuck to the MCTS/polyimide piece. However, in the areas where the MPL layer remained on the DCC, the MPL was embossed with the groove pattern of the MCTS, as the optical micrograph of FIG. 10 shows. The mudcracking pattern of the carbon dispersion coating is clearly much larger than the MCTS pattern (12 microns peak to peak, 6 microns peak to valley) and the variation in height of the MPL surface is also much larger that the MCTS grooves (depth of 6 microns). Still, most of the surface is patterned, suggesting that during the pressing, there was adequate contact between the MPL and the MCTS to emboss the MPL.

EXAMPLE 2

It is desirable to emboss the DCC without having the MPL layer stick to the MCTS. One way to reduce this undesirable effect is to use a release layer on the MCTS, or a surface which will not stick to the MPL. In this example, a whisker coated MCTS was used, so the nanostructure layer acts as the release layer. The release layer may comprise a perylene nanostructured whicker coated MCTS, or the perylene whiskers may be coated with catalyst such as Pt. In the latter case, there may be additional catalyst available at the DCC/CCM interface, which may enhance catalyst activity at the interface.

For this example, a 2.5"×2.5" piece of catalyst coated MCTS, 0.22 mg/cm$^2$ Pt sputter deposited at 100 mTorr on standard PR149 perylene red whisker coated MCTS) was laid against the coated side of a piece of carbon dispersion coated cloth (TEXTRON HCB with 1% PTFE/20V/14-2) so that the MPL side of the DCC was in contact with the nanostructured elements formed on the microtextured side of the MCTS. The same sandwich construction was used as in the first example above, with fresh pieces of polyimide and paper (on the outside). The six layer sandwich was pressed between the stainless steel plates for 2 minutes ate 6000 lbs. When disassembled, none of the MPL had transferred to the MCTS piece. It was not possible to visually ascertain if any catalyst coated whiskers transferred to the MPL, however, the MCTS piece did appear to have the woven cloth pattern on its surface, perhaps from catalyst coated whiskers being transferred to the DCC at those points of contact.

Figure 11:
FIG. 11 is an optical micrograph of a DCC having the MPL embossed with the groove pattern of an MCTS using a release layer in accordance with embodiment of the invention.

As FIG. 11 shows, the MCTS grooves were readily apparent in this MPL surface as well. This appears to be a preferred way of embossing the features of the MCTS onto the surface of the DCC, without removal of the MPL. If some catalyst did transfer to the MPL, the transfer could be beneficial.

EXAMPLE 3

This example shows the improvement in fuel cell performance with microstructure embossed MPL coated carbon cloth surfaces prepared as in Example 2.

Figure 12:
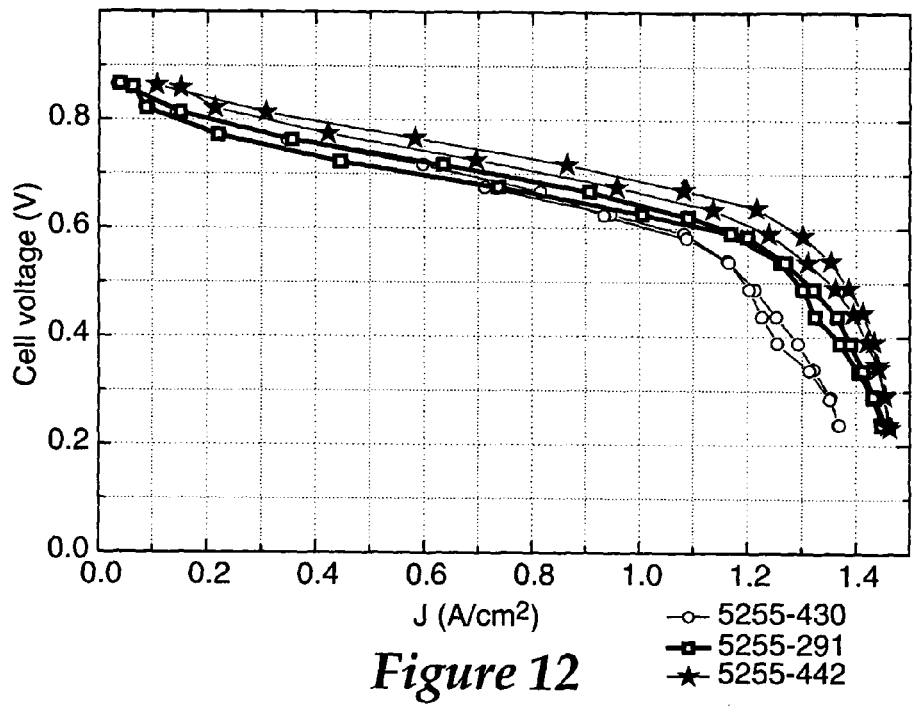
FIGS. 12 and 13 show stabilized polarization curves obtained at various conditions showing the improvement in fuel cell performance with microstructure embossed MPL coated carbon cloth surfaces in accordance with embodiments of the invention.
Figure 13:
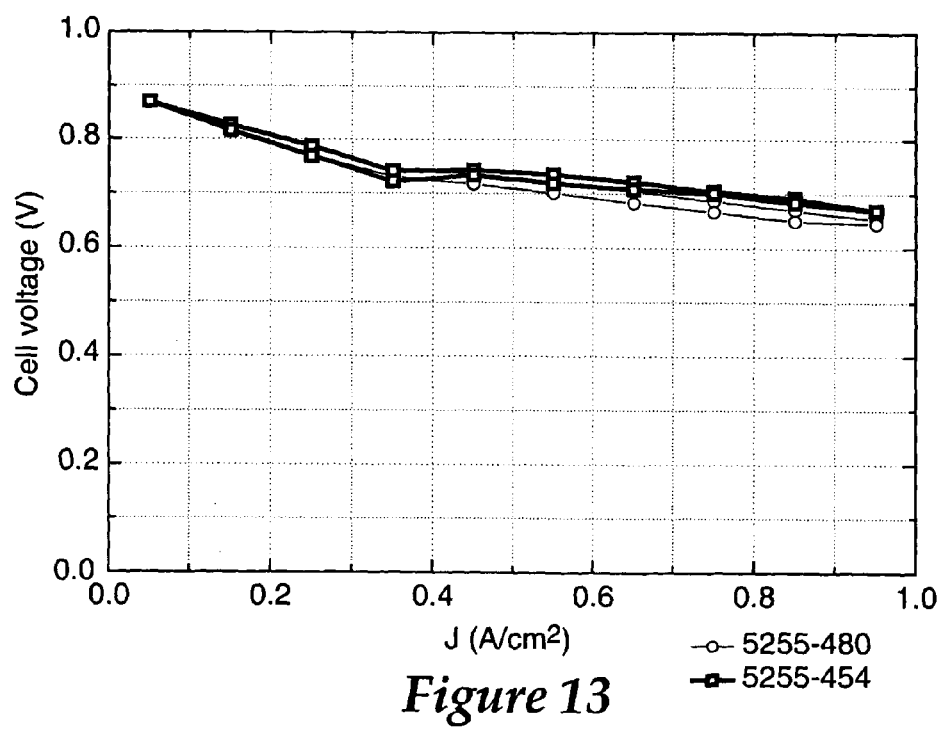

Two pieces of MCTS embossed coated TEXTRON cloth, prepared as in Example 2 were placed on either side of a 50 cm$^2$ CCM made with 0.2 mg/cm$^2$ of Pt coated nanostructured whiskers and a 30 micron thick, cast Nafion™ film. FIGS. 12 and 13 show stabilized polarization curves obtained at various conditions, including 30 psig pressurized air and hydrogen at 75° C. and 80° C., and ambient pressure air and hydrogen at 75° C. FIG. 12 illustrates fuel cell polarization curves obtained in a potentiodynamic scanning mode from an MEA having the surface embossed DCCs from Example 2. FIG. 13 illustrates fuel cell polarization curves from the same MEA as used in FIG. 12, obtained in a galvanodynamic scanning mode, under totally dry and totally saturated inlet gas humidification conditions.

In FIG. 12, the polarization curves were obtained in a potentiodynamic scan mode. Notable in FIG. 12 is that at 75° C., the MEA produced 0.4 A/cm$^2$ at 0.8 volts at 30 psig with dry inlet conditions (0% relative humidities), and 0.2 A/cm$^2$ at 0.8 volts at ambient pressure, both in the up-scan of the polarization curves. These results are compared in Table 1 with similarly extracted values from similarly obtained polarization curves, from a range of MEAs using CCMs fabricated under the same membrane and Pt catalyst loadings on the cathode. Table 1 provides a comparison of fuel cell performance using a microtextured DCC of the instant invention (FC5255) with comparative examples not having the microtextured DCC surface pattern.

In these comparative examples, different types of cloth based DCCs are used but all having the as-made planar, or non-embossed MPL coatings. As see, of all these cases, the current density at 0.8 V is highest for the DCCs of the instant invention. Some of the counter examples in Table 1 utilize a single channel flow field instead of a quad-serpentine flow field, leading to higher inlet pressures than exist with the quad-serpentine flow field. In those cases, the approximately 10 psig inlet pressure will give higher current density at 0.8 V than that produced by the quad-serpentine flow field produces, and so artificially appear higher than if those same MEAs were tested in a quad-serpentine flow field as used for sample FC5255 of the instant invention.

TABLE 1

| FC# | A/C Cat. | DCC (A/C) | FF type | J(0.8 V), 0 psig, 75 C. | J(0.8 V), 30 psig, 75 C. | Comment |
|---|---|---|---|---|---|---|
| 5255 | Pt/Pt | HCB/HCB | Q-Serp | 0.2 | 0.4 | Embossed DCC |
| 4945 | PtRu/Pt | HCB/HCB | Q-Serp | 0.10 | 0.30 | Flat DCC |
| 5023 | PtRu/Pt | HCB/HCB | Q-Serp | 0.10 | 0.25 | Flat DCC, ~10 psig inlet |
| 4534 | Pt/Pt | CCB/HCB | I-Serp | "0.2" | 0.3 | Flat DCC, ~10 psig inlet |

TABLE 1-continued

| FC# | A/C Cat. | DCC (A/C) | FF type | J(0.8 V), 0 psig, 75 C. | J(0.8 V), 30 psig, 75 C. | Comment |
|---|---|---|---|---|---|---|
| 4498 | Pt/Pt | CCB/HCB | I-Serp | 0.16 | 0.3 | Flat DCC, ~10 psig inlet |
| 5029, 4924, 4806, 4956 | PtRu/Pt | Various CCB/HCB | I-Serp | 0.10-0.16 | 0.3 | Flat DCC, ~10 psig inlet |
| 4632 | PtRu/Pt | CCB/HCB | I-Serp | 0.17 | 0.29 | Flat DCC, ~10 psig inlet |
| 4956 | PtRu/Pt | PW03/PW03 | I-Serp | 0.16 | 0.33 | Flat DCC, ~10 psig inlet |

Referring to FIG. 13, the fact that the galvanodynamic polarization curves are highly stable and essentially identical for either fully saturated or dry operating conditions may also be a consequence of the improved interface between the DCC and CCM. As previously mentioned, if water is trapped between the planar DCC surface and the residual grooves of the CCM, then cathode flooding could exist. Eliminating these water traps by the microtextured DCC of the present invention could help to prevent this flooding. The ability to operate over such a wide range of humidification levels is an important system advantage provided by the microtextured DCC.

EXAMPLE 4

The same process as described above in Examples 1 and 2 using the coated carbon cloth was repeated with a carbon dispersion coated carbon paper, TORAY ® carbon paper which may be obtained from ElectroChem, Inc., Woburn, Mass. The same MCTS as in previous examples was used as the embossing tool, where the MCTS had Pt coated nanostructured whiskers formed on the microtextured pattern. The sandwich stacking layers and press forces were the same as for Examples 1 and 2.

The result was that the brittle paper DCC fractured and stuck to the MCTS on one edge. Where the TORAY ® paper DCC did separate easily form the MCTS embossing substrate, the MCTS appeared to have been inflexible and less compressible than the cloth so that the carbon dispersion coating in the areas between the fibers could not contact the MCTS embossing surface. This prevented the embossing from being complete over the surface of the Toray paper. This non-compliance of the surface and its stiffness leading to breakage means that the TORAY ® paper may be a less desirable candidate than the cloth for this means of embossing the DCC surface.

The above method used to emboss the MCTS pattern into the MPL coating on the DCC electrode backing, was a hot static press process. Passing the coated DCC electrode backing as a web through a calendaring nip roller having the MCTS pattern on the roll tools could be used as a continuous process for patterning the MPL so it matched that of the CCM. In another implementation, the coating process for applying the MPL to the surface of the DCC electrode may involve applying the carbon dispersion layer with a patterned tool. In yet another implementation, the microtextured features may be formed in the MPL layer with a patterned tool edge when the MPL layer is still wet so that the resultant dried surface would have the desired structure to match that of the CCM.

EXAMPLES 5, 6, 7

An MCTS tool with a geometric pattern was made by machine-cutting a 20 cm×20 cm patch pattern into a copper plate that was later electroplated with Ni. The new pattern consists of repeating pyramid structures with 12 μm×12 μm square bases and pyramid heights of 6 μm. The new pattern utilized the same cut program used to produce the V-groove MCTS pattern shown in FIG. 1. The pattern was cut first in one direction to produce the V-grooves, and then a second time in the orthogonal direction to produce the pyramids. The new microstructured pattern is shown in FIG. 9A. As with the V-groove pattern, the pyramid pattern has a 9 μm peak that is repeated every thirtieth groove in both directions. Twenty centimeter by 20 cm square MCTS substrate samples were fabricated with the pyramid tool using hand-spreads by the cast and cure method described in U.S. Pat. No. 6,136,412. FIG. 9B is a 400× magnification of the actual tool showing the 9 μm peaks.

Nanostructured catalyst-support elements were formed on the MCTS substrates in the same manner described in previous examples. Pure Pt with a loading of 0.15 mg/cm² was electron beam vapor deposited onto the surfaces of the MCTS substrates. FIGS. 9C and 9D show scanning electron microscope images of the catalyst coated MCTS substrates. The nanostructured catalyst elements were then transferred from the catalyst coated MCTS samples to both surfaces of a 30 μm thick sheet of perfluorinated sulfonic acid proton exchange membrane having an equivalent weight of 1000, to form a catalyst coated membrane with an active area of 50 cm². The catalyst transfer process used the lamination method described in US20050069755, with roll temperatures of 160° C. and cylinder pressure of 115 psi (790 kPa). The same pyramidal MCTS samples, now devoid of catalyst, were then used to emboss the pyramidal structure into the MPL carbon dispersion coating of one set (anode and cathode) of the TEXTRON carbon cloth using a static hot press by the same method described in Example 2. To minimize sticking of the MCTS and MPL coating of the DCC, the layers were separated while the laminated sandwich was still hot after the two minute compression period.

Figure 14:
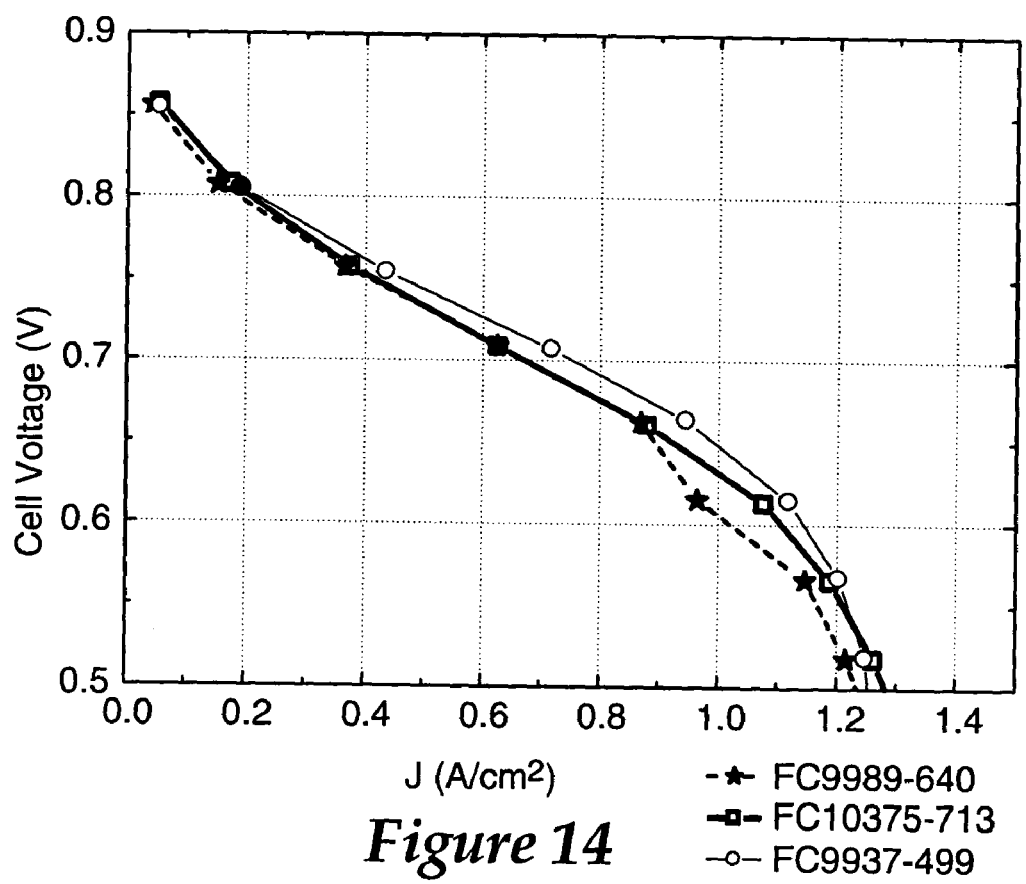
FIG. 14 shows stabilized polarization curves illustrating improvement in fuel cell performance using DCCs and CCM having pyramidal microtextures in accordance with embodiments of the invention.

Three fuel cell MEA's were assembled and tested using the pyramidal CCM's and either the flat DCC's (Examples 5 and 6) or a pyramidal embossed DCC (Example 7). FIG. 14 shows the ambient air pressure, constant flow, hydrogen/air polarization curves obtained under identical conditions from the three cells after each had fully stabilized. The two samples in which the pyramidal CCM is matched to a flat DCC give the same performance of cell voltage versus cell current density. The MEA having both a pyramidal embossed CCM and an embossed DCC is seen to have superior performance over the entire useful range of cell voltage of 0.6 to 0.8 volts.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A membrane electrode subassembly, comprising:
    an ion conducting membrane comprising a microtextured first surface;
    a microporous layer of a diffusion current collector, the microporous layer comprising a microtextured second surface, the microtextured first surface and the microtextured second surface comprising complementary features, wherein the features of the microtextured second surface are configured to engage the features of the microtextured first surface; and a catalyst layer disposed between the first and second microtextured surfaces.

2. The subassembly according to claim 1, further comprising an electrode backing, wherein the microporous layer is disposed on the electrode backing.

3. The subassembly according to claim 1, wherein the complementary features facilitate frictional linkage between the microtextured first and second surfaces.

4. The subassembly according to claim 1, wherein the complementary features facilitate mechanical linkage between the microtextured first and second surfaces.

5. The subassembly according to claim 1, wherein the complementary features facilitate mechanical capture between the microtextured first and second surfaces.

6. The subassembly according to claim 1, wherein the complementary features facilitate an interference fit between the microtextured first and second surfaces.

7. The subassembly according to claim 1, wherein the complementary features facilitate an interlocking fit between the microtextured first and second surfaces.

8. The subassembly according to claim 1, wherein the complementary features facilitate a fractal interlocking fit between the microtextured first and second surfaces.

9. The subassembly according to claim 1, wherein the complementary features facilitate a press fit between the microtextured first and second surfaces.

10. The subassembly according to claim 1, wherein the complementary features facilitate a tongue and groove fit between the microtextured first and second surfaces.

11. The subassembly according to claim 1, wherein the features of the microtextured first surface have a shape differing from a shape of the features of the microtextured second surface.

12. The subassembly according to claim 1, wherein the complementary features have a generally pyramidal shape.

13. The subassembly according to claim 1, wherein the complementary features have a generally sawtooth shape.

14. The subassembly according to claim 1, wherein the complementary features comprise ridges.

15. The subassembly according to claim 1, wherein the complementary features comprise grooves.

16. The subassembly according to claim 1, wherein the catalyst layer comprises one or more thin films of catalyst material.

17. The subassembly according to claim 1, wherein the catalyst layer comprises a nanostructured catalyst layer.

18. The subassembly according to claim 17, wherein the nanostructured catalyst layer comprises nanostructured support whiskers bearing nanoscopic catalyst particles or a thin catalyst film.

19. The subassembly according to claim 18, wherein the nanostructured support whiskers comprise perylene red.

20. The subassembly according to claim 1, comprising a catalyst coated membrane, the catalyst coated membrane including the ion conducting membrane and the catalyst layer.

21. The subassembly according to claim 1, further comprising registration features disposed on the microtextured first and second surfaces.

22. The subassembly according to claim 1, wherein the ion conducting membrane comprises a microtextured third surface, the subassembly further comprising:

a second microporous layer comprising a microtextured fourth surface, the microtextured third surface and the microtextured fourth surface comprising complementary features, wherein the features of the microtextured fourth surface are configured to engage the features of the microtextured third surface; and a second catalyst layer disposed between the microtextured third surface and the microtextured fourth surface.

23. The subassembly according to claim 22, further comprising:

a first electrode backing layer, the microporous layer disposed on the first electrode backing layer; and a second electrode backing layer, the second microporous layer disposed on the second electrode backing layer.

24. The subassembly according to claim 22, wherein at least one of the subassembly components are formed as a roll good.

25. The subassembly according to claim 22, further comprising first and second flow field plates comprising an arrangement of gas flow channels and lands, the flow field plates contacting the first and the second electrode backing layers under compressive force, the complementary features facilitating an interface between the microtextured surfaces that substantially prevents tenting of the microtextured surfaces under the compressive force.

26. A method of manufacturing a subassembly, comprising:

developing a microtextured first surface on an ion conducting membrane;

developing a microtextured second surface on a microporous layer of a diffusion current collector layer, the microtextured first surface and the microtextured second surface comprising complementary features, wherein the features of the microtextured first surface are configured to engage the features of the microtextured second surface; and disposing a catalyst layer between the microtextured first surface and the microtextured second surface.

27. The method according to claim 26, wherein developing the microtextured first surface comprises imparting the microtextured surface to the ion conducting membrane while transferring the catalyst layer to the ion conducting membrane.

28. The method according to claim 26, wherein developing the microtextured second surface comprises imparting the microtextured surface to the diffusion current collector while transferring the catalyst layer to the diffusion current collector.

29. The method according to claim 26, wherein at least one of the microtextured first and second surfaces is developed using an embossing process.

30. The method according to claim 26, wherein each of the microtextured first and second surfaces is developed using an embossing process.

31. The method according to claim 26, wherein at least one of the microtextured first and second surfaces is developed using an embossing tool.

32. The method according to claim 26, wherein at least one of the microtextured first and second surfaces is developed using an embossing drum or wheel.

33. The method according to claim 26, further comprising developing a microtextured pattern on a transfer substrate, wherein:

the microtextured first surface on the membrane is developed using the microtextured pattern on the transfer substrate; and the microtextured second surface on the DCC layer is developed using the microtextured pattern on the transfer substrate.

34. The method according to claim 33, further comprising providing a release layer on the transfer substrate.

35. The method according to claim 33, wherein the transfer substrate comprises a catalyst provided on the release layer.

36. The method according to claim 33, wherein the release layer comprises a nanostructured layer.

37. The method according to claim 33, wherein the release layer comprises nanostructured support whiskers comprising perylene red.

38. The method according to claim 33, further comprising developing registration features on the microtextured first and second surfaces.

39. The method according to claim 33, wherein the method of manufacturing the subassembly is implemented at least in part using a web processing technique.

* * * * *